(12) United States Patent
Rezaeian et al.

(10) Patent No.: US 11,702,085 B2
(45) Date of Patent: Jul. 18, 2023

(54) VEHICLE CENTER OF GRAVITY HEIGHT DETECTION AND VEHICLE MASS DETECTION USING LIGHT DETECTION AND RANGING POINT CLOUD DATA

(71) Applicants: Ayyoub Rezaeian, Lake Orion, MI (US); Dalong Li, Troy, MI (US)

(72) Inventors: Ayyoub Rezaeian, Lake Orion, MI (US); Dalong Li, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 263 days.

(21) Appl. No.: 17/092,483

(22) Filed: Nov. 9, 2020

(65) Prior Publication Data
US 2022/0144289 A1    May 12, 2022

(51) Int. Cl.
*B60W 40/13* (2012.01)
*G01M 1/12* (2006.01)
*G01G 9/00* (2006.01)
*G01G 19/03* (2006.01)
*B60W 60/00* (2020.01)

(52) U.S. Cl.
CPC .......... *B60W 40/13* (2013.01); *B60W 60/001* (2020.02); *G01G 9/00* (2013.01); *G01G 19/03* (2013.01); *G01M 1/122* (2013.01); *B60W 2040/1315* (2013.01); *B60W 2420/52* (2013.01); *B60W 2510/06* (2013.01); *B60W 2510/08* (2013.01); *B60W 2510/20* (2013.01); *B60W 2510/222* (2013.01); *B60W 2520/00* (2013.01)

(58) Field of Classification Search
CPC ..... B60W 2040/1315; B60W 2420/52; B60W 40/13; B60W 60/001; B60W 2510/06; B60W 2510/08; B60W 2510/20; B60W 2510/222; B60W 2520/00; G01G 19/00; G01G 19/03; G01G 19/08; G01G 19/086; G01M 1/122; G01M 1/12; G01C 3/00; G01C 5/00; G01D 11/00; G01D 11/10; G06T 7/00; G06T 7/50; G06T 7/521; G06T 7/70; G06T 7/73; G06T 11/005
USPC .......................................................... 701/23
See application file for complete search history.

(56) References Cited

U.S. PATENT DOCUMENTS 11,199,614 B1 * 12/2021 Gan ....................... G01S 17/42
2005/0102083 A1    5/2005 Xu et al.
(Continued)

FOREIGN PATENT DOCUMENTS

WO    WO-2021143778 A1 *   7/2021   ............. G01C 21/30

*Primary Examiner* — Anthony R Jimenez
(74) *Attorney, Agent, or Firm* — Jeremy J. Klobucar

(57) ABSTRACT

Vehicle center of gravity (CoG) height and mass estimation techniques utilize a light detection and ranging (LIDAR) sensor configured to emit light pulses and capture reflected light pulses that collectively form LIDAR point cloud data and a controller configured to estimate the CoG height and the mass of the vehicle during a steady-state operating condition of the vehicle by processing the LIDAR point cloud data to identify a ground plane, identifying a height difference between (i) a nominal distance from the LIDAR sensor to the ground plane and (ii) an estimated distance from the LIDAR sensor to the ground plane using the processed LIDAR point cloud data, estimating the vehicle CoG height as a difference between (i) a nominal vehicle CoG height and the height difference, and estimating the vehicle mass based on one of (i) vehicle CoG metrics and (ii) dampening metrics of a suspension of the vehicle.

18 Claims, 4 Drawing Sheets

(56) References Cited

U.S. PATENT DOCUMENTS

2010/0017128 A1  1/2010  Zeng
2020/0341116 A1* 10/2020  Smith .................... G01S 17/89

* cited by examiner

VEHICLE CENTER OF GRAVITY HEIGHT DETECTION AND VEHICLE MASS DETECTION USING LIGHT DETECTION AND RANGING POINT CLOUD DATA

FIELD

The present application generally relates to autonomous vehicles and, more particularly, to a vehicle center of gravity height detection and vehicle mass detection using light detection and ranging (LIDAR) point cloud data.

BACKGROUND

Some vehicles are equipped with an advanced driver assistance (ADAS) or autonomous driving system that is configured to perform one or more assistance or autonomous driving features (e.g., adaptive cruise control, lane centering, collision avoidance, etc.). Two important vehicle body parameters used by some autonomous driving features are a height of the vehicle's center of gravity (CoG) and a mass of the vehicle. Because the configuration of the vehicle (number of passengers, seating arrangement of passengers, cargo load, etc.) varies from trip to trip, these parameters need to be accurately determined for each vehicle trip. Unfortunately, there are no sensors in current vehicles that are able to directly measure these parameters. Conventional vehicle lateral and/or longitudinal dynamics based solutions require the vehicle to be experiencing excitation conditions (e.g., acceleration or deceleration) and may also require additional sensors, such as gyros. Accordingly, while conventional vehicle CoG height and vehicle mass detection techniques for autonomous driving features do work well for their intended purpose, there exists an opportunity for improvement in the relevant art.

SUMMARY

According to one example aspect of the invention, a center of gravity (CoG) height and mass estimation system for a vehicle is presented. In one exemplary implementation, the system comprises a light detection and ranging (LIDAR) system configured to emit light pulses and capture reflected light pulses that collectively form LIDAR point cloud data and a controller configured to estimate the CoG height and the mass of the vehicle during a steady-state operating condition of the vehicle by: processing the LIDAR point cloud data to identify a ground plane, identifying a height difference between (i) a nominal distance from the LIDAR sensor to the ground plane and (ii) an estimated distance from the LIDAR sensor to the ground plane using the processed LIDAR point cloud data, estimating the vehicle CoG height as a difference between (i) a nominal vehicle CoG height and the height difference, and estimating the vehicle mass based on one of (i) vehicle CoG metrics and (ii) dampening metrics of a suspension of the vehicle.

In some implementations, the vehicle further comprises an autonomous driving system comprising a model configured to utilize the estimated vehicle CoG height and the estimated vehicle mass as part of an autonomous driving feature. In some implementations, the processing of the LIDAR point cloud data to identify the ground plane comprises (i) filtering the LIDAR point cloud data to extract points having z-coordinates in a predetermined range and (ii) implementing a least square algorithm with the extracted points from the LIDAR point cloud data to identify the ground plane. In some implementations, the processing of the LIDAR point cloud data comprises identifying an intersection between the ground plane and a z-axis of the LIDAR point cloud data to estimate the distance from the LIDAR sensor to the ground plane.

In some implementations, the estimating of the vehicle mass based on vehicle CoG metrics comprises (i) determining a relationship between the vehicle CoG and a CoG of an extra mass in the vehicle and (ii) implementing a least square algorithm to estimate the vehicle mass based on the determined relationship. In some implementations, the estimating of the vehicle mass based on vehicle suspension dampening metrics comprises (i) determining a spring stiffness of the vehicle suspension and (ii) estimating the vehicle mass based on the LIDAR point cloud data and the vehicle suspension spring stiffness.

In some implementations, the controller is further configured to estimate the vehicle CoG height and vehicle mass during an excitation operating condition of the vehicle based on vehicle lateral and/or longitudinal dynamics and vehicle powertrain and/or suspension characteristics. In some implementations, the controller is configured to, during the excitation operating condition of the vehicle: estimate the vehicle CoG height based on vehicle lateral and longitudinal motion and based on suspension characteristics or additional gyro devices, and estimate the vehicle mass based on vehicle longitudinal dynamics and vehicle powertrain characteristics. In some implementations, the excitation operating condition of the vehicle comprises at least one of (i) acceleration or deceleration of the vehicle above a first threshold and (ii) a steering angle of the vehicle above a second threshold.

According to another example aspect of the invention, a CoG height and mass estimation method for a vehicle is presented. In one exemplary implementation, the method comprises receiving, from a controller of a vehicle, LIDAR point cloud data from a LIDAR sensor of the vehicle, the LIDAR sensor being configured to emit light pulses and capture reflected light pulses that collectively form LIDAR point cloud data and during a steady-state operating condition of the vehicle, estimating, by the controller, the CoG height and the mass of the vehicle during a steady-state operating condition of the vehicle by: processing, by the controller, the LIDAR point cloud data to identify a ground plane, identifying, by the controller, a height difference between (i) a nominal distance from the LIDAR sensor to the ground plane and (ii) an estimated distance from the LIDAR sensor to the ground plane using the processed LIDAR point cloud data, estimating, by the controller, the vehicle CoG height as a difference between (i) a nominal vehicle CoG height and the height difference, and estimating, by the controller, the vehicle mass based on one of (i) vehicle CoG metrics and (ii) dampening metrics of a suspension of the vehicle.

In some implementations, the vehicle further comprises an autonomous driving system comprising a model configured to utilize the estimated vehicle CoG height and the estimated vehicle mass as part of an autonomous driving feature. In some implementations, the processing of the LIDAR point cloud data to identify the ground plane comprises (i) filtering, by the controller, the LIDAR point cloud data to extract points having z-coordinates in a predetermined range and (ii) implementing, by the controller, a least square algorithm with the extracted points from the LIDAR point cloud data to identify the ground plane. In some implementations, the processing of the LIDAR point cloud data comprises identifying, by the controller, an intersection between the ground plane and a z-axis of the LIDAR point cloud data to estimate the distance from the LIDAR sensor to the ground plane.

In some implementations, the estimating of the vehicle mass based on vehicle CoG metrics comprises (i) determining, by the controller, a relationship between the vehicle CoG and a CoG of an extra mass in the vehicle and (ii) implementing, by the controller, a least square algorithm to estimate the vehicle mass based on the determined relationship. In some implementations, the estimating of the vehicle mass based on vehicle suspension dampening metrics comprises (i) determining, by the controller, a spring stiffness of the vehicle suspension and (ii) estimating, by the controller, the vehicle mass based on the LIDAR point cloud data and the vehicle suspension spring stiffness.

In some implementations, the method further comprises estimating, by the controller, the vehicle CoG height and vehicle mass during an excitation operating condition of the vehicle based on vehicle lateral and/or longitudinal dynamics and vehicle powertrain and/or suspension characteristics. In some implementations, the method further comprises during the excitation operating condition of the vehicle: estimating, by the controller, the vehicle CoG height based on vehicle lateral and longitudinal motion and based on suspension characteristics or additional gyro devices, and estimating, by the controller, the vehicle mass based on vehicle longitudinal dynamics and vehicle powertrain characteristics. In some implementations, the excitation operating condition of the vehicle comprises at least one of (i) acceleration or deceleration of the vehicle above a first threshold and (ii) a steering angle of the vehicle above a second threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, vehicle center of gravity (CoG) height and vehicle mass are important parameters for some autonomous driving features and there exists an opportunity for improvement in the art of vehicle CoG height and vehicle mass detection. Accordingly, improved vehicle CoG height and vehicle mass estimation techniques are presented. These techniques are capable of accurately estimating vehicle CoG height and vehicle mass during steady-state operating conditions of the vehicle (e.g., cruise conditions along a road or highway). In other words, excitation conditions (e.g., acceleration or deceleration) of the vehicle are not required for these estimation techniques. During excitation conditions, however, the conventional techniques based on lateral and/or longitudinal dynamics and vehicle powertrain and/or suspension characteristics can be utilized. The steady-state operation estimation techniques utilize LIDAR point cloud data captured by a LIDAR sensor, which is filtered and points indicative of a ground plane are extracted. A height difference between the LIDAR sensor and the ground plane are then compared to a nominal height difference (e.g., with no additional vehicle passengers/mass) to estimate the vehicle CoG. One of two techniques is then utilized to estimate the vehicle mass: (1) a vehicle CoG based technique or (2) a vehicle suspension dampening metrics based technique. The estimated vehicle CoG and vehicle mass are then utilized as part of one or more autonomous driving features of the vehicle.

Figure 1:
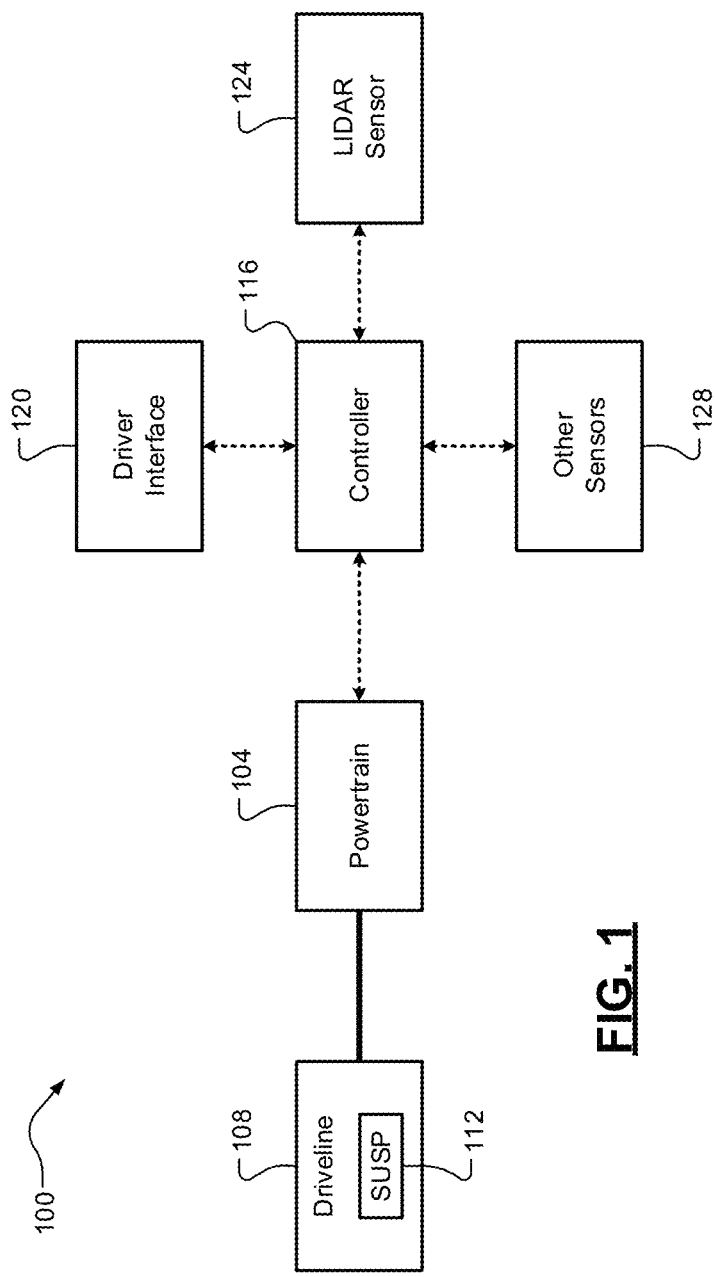
FIG. 1 is a functional block diagram of a vehicle having an example vehicle center of gravity (CoG) height and vehicle mass estimation system according to the principles of the present disclosure.

Referring now to FIG. 1, a functional block diagram of an example vehicle 100 having an autonomous driving system according to the principles of the present disclosure. The vehicle 100 comprises a powertrain 104 (an engine, an electric motor, combinations thereof, etc.) that generates drive torque. The drive torque is transferred to a driveline 108 (e.g., wheels) of the vehicle 100 for propulsion. The driveline 108 comprises or interacts with a suspension (SUSP) 112 (tires, springs, shock absorbers, linkages, etc.). A controller 116 controls operation of the powertrain 104 to achieve a desired amount of drive torque, e.g., based a driver torque request provided via a driver interface 120. The controller 116 also implements one or more autonomous driving or ADAS features (automated braking, collision avoidance, etc.). The autonomous driving system of the present disclosure therefore generally comprises the controller 116, a LIDAR system or sensor 124, and one or more other sensors 128. Non-limiting examples of these other sensors 128 include lateral and longitudinal acceleration sensors (e.g., gyros) and a steering angle sensor. The LIDAR sensor 124 is configured to emit light pulses and capture reflected light pulses that collectively form a LIDAR point cloud. The controller 116 is also configured to perform at least a portion of the vehicle CoG height and vehicle mass estimation techniques of the present disclosure, which will now be described in greater detail with specific reference to FIGS. 2A-2C and 3.

Referring now to FIGS. 2A-2C and 3 and with continued reference to FIG. 1, two example vehicle models 200, 220, an example vehicle ground plane estimation technique 230, and an example vehicle CoG height and vehicle mass estimation architecture 300 are illustrated. As previously mentioned, when there are excitation conditions present, the conventional techniques based on lateral and/or longitudinal dynamics and vehicle powertrain and/or suspension characteristics can be utilized. Thus, the architecture 300 comprises a steady-state vehicle CoG height and vehicle mass estimation function 304 ("function 304") that is selectively activated by function activator 308.

This function activator 308 determines whether vehicle excitation conditions are present based on signals from the other sensors 128 indicative of strong forces acting on the vehicle 100 (steering angle ($\delta_{SA}$), longitudinal acceleration ($\alpha_x$), lateral acceleration ($\alpha_x$), etc.). When vehicle excitation conditions are not present, the function activator 308 generates an activation signal for function 304. The primary input for function 304 is the LIDAR point cloud data captured by the LIDAR sensor 124. Function block 312 performs filtering and extraction on the LIDAR point cloud to identify the ground plane (e.g., see 234 of FIG. 2C). As shown, points (e.g., point $x_{p1}$, $y_{p1}$, $z_{p1}$) having a z-coordinate equal to or within a threshold from the ground plane are extracted.

Figure 2A:
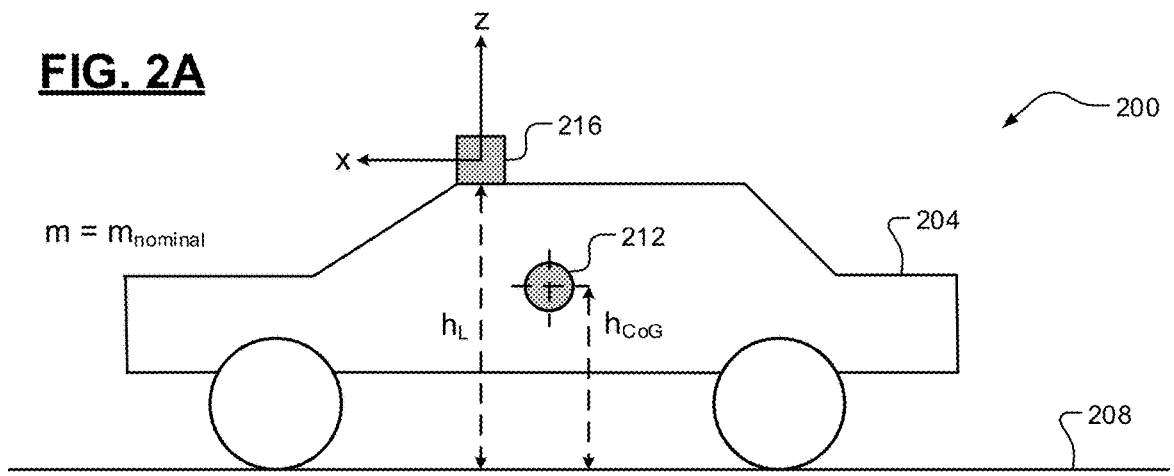
FIGS. 2A-2C are diagrams illustrating an example vehicle CoG height and vehicle mass estimation technique according to the principles of the present disclosure.
Figure 2B:
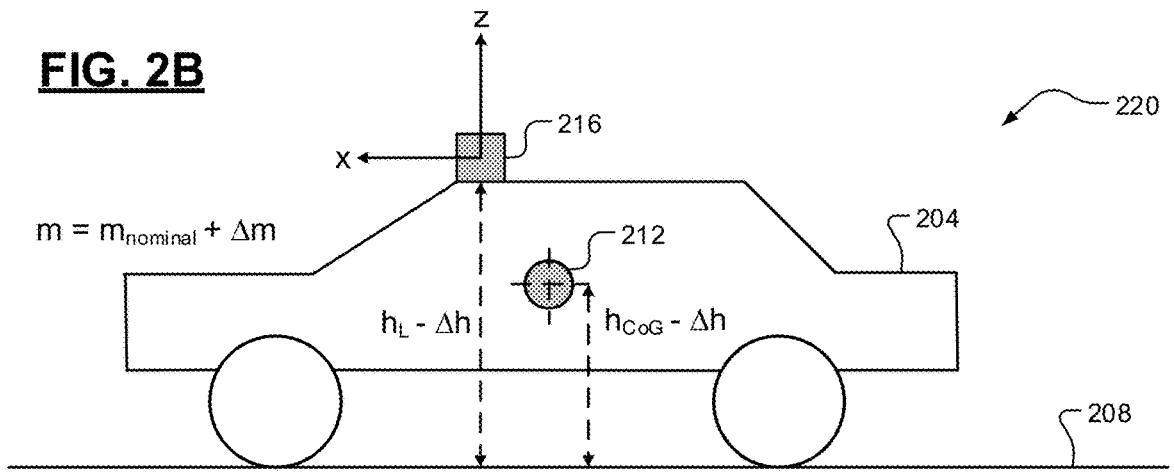
Figure 2C:
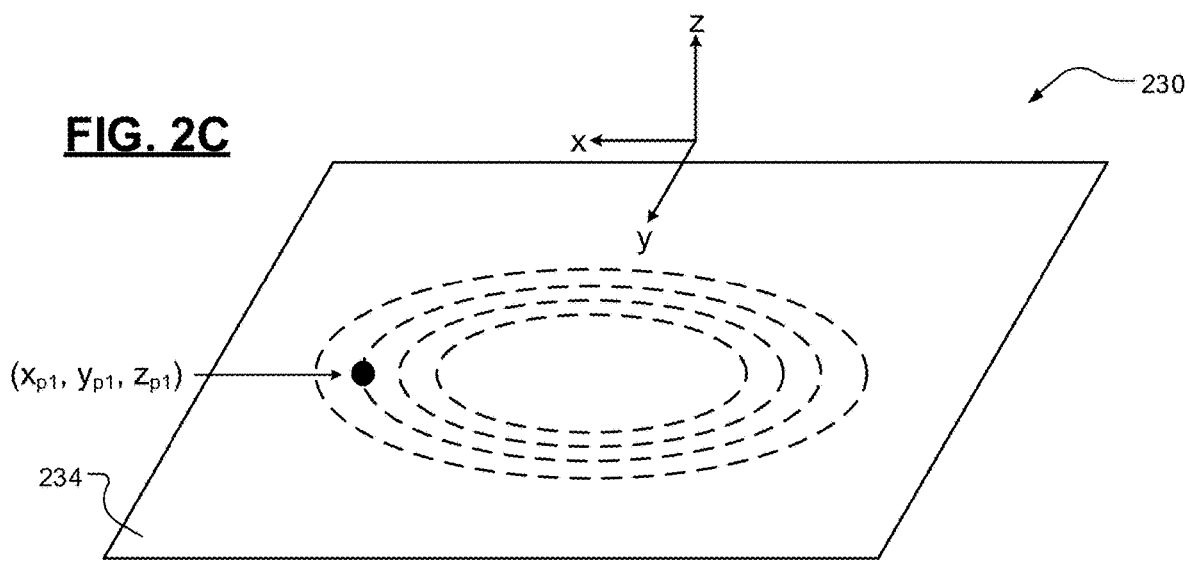
Figure 3:
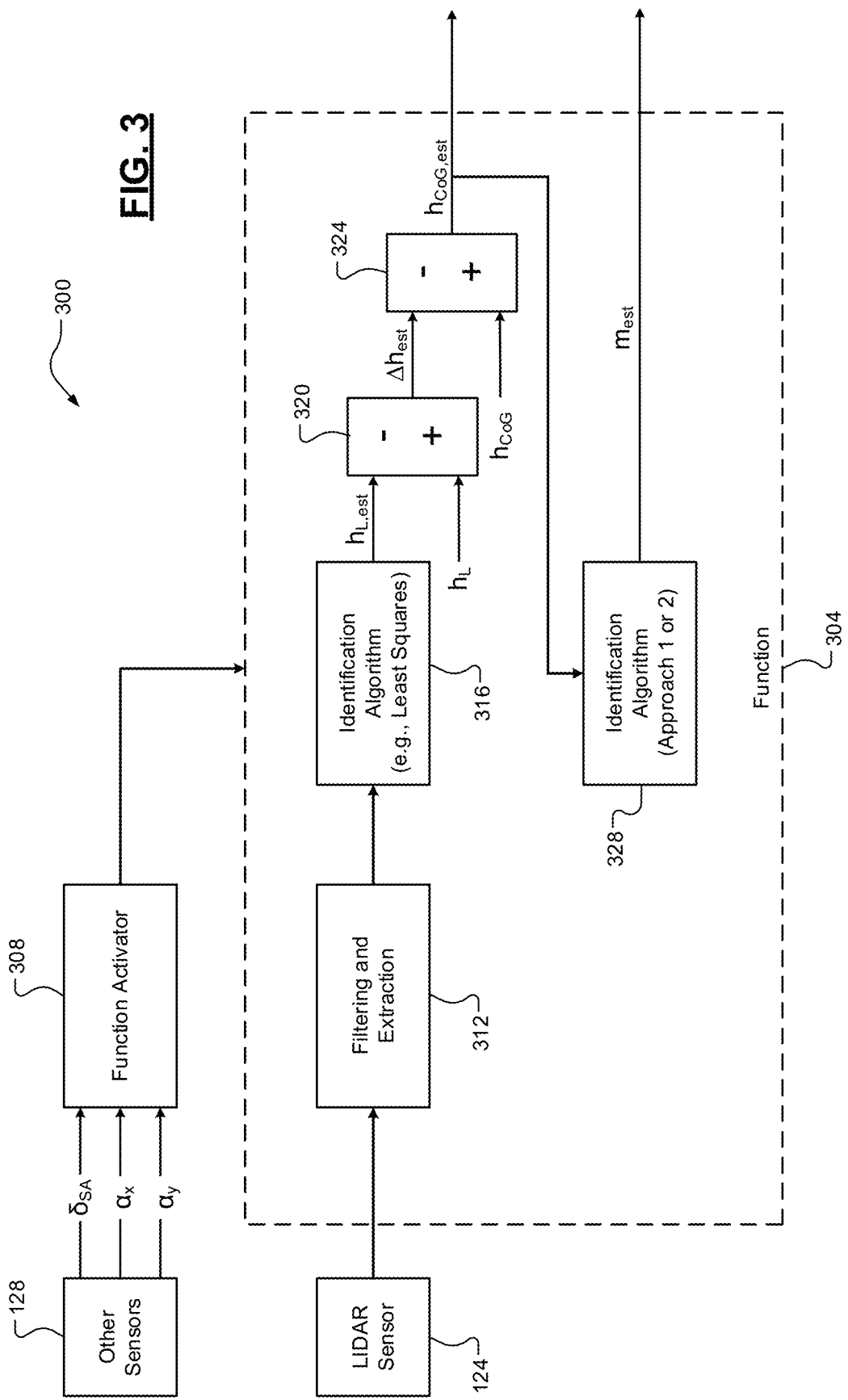
FIG. 3 is a functional block diagram of an example vehicle CoG height and vehicle mass estimation architecture according to the principles of the present disclosure.

Referring now to FIGS. 2A-2B and with continued reference to FIG. 3, function block 316 uses the identified ground plane and an identification algorithm (e.g., least squares) to estimate the LIDAR sensor height ($h_{L,est}$) relative to its nominal height ($h_L$). In FIG. 2A, the vehicle model 200 illustrates a nominal scenario where the vehicle 204 has a nominal mass ($m=m_{nominal}$; i.e., there are no passengers or additional mass). The nominal CoG height ($h_{CoG}$) represents the height from the ground surface 208 to the vehicle CoG point 212. The nominal LIDAR sensor height ($h_L$) represents the height from the ground surface 208 to the center of the LIDAR sensor 216, which is configured to emit light pulses in all directions represented by a longitudinal (x), lateral (y, now shown), and vertical (z) three-dimensional (3D) coordinate space. In contrast to FIG. 2A, FIG. 2B illustrates a vehicle model 220 where the vehicle 204 has additional mass ($\Delta m$, where $m=m_{nominal}+\Delta m$). This additional mass $\Delta m$ causes the vehicle CoG height $h_{CoG}$ and the LIDAR sensor height $h_L$ to both decrease by a height difference ($\Delta h$).

Referring again to FIG. 3 and with continued reference to FIGS. 2A-2B, the difference ($\Delta h_{est}$) between these values is calculated at function block 320, and then the difference ($h_{CoG,est}$) between that value and the nominal vehicle CoG height $h_{CoG}$ is then calculated at function block 324 to estimate the vehicle CoG height $h_{CoG,est}$. This value is output by the function 304, and is also fed to function block 328, which utilizes one of the two identification algorithms (Approach 1 or Approach 2) to estimate and output the vehicle mass ($m_{est}$). In Approach 1, it is assumed that there are two individual objects: the vehicle and any extra mass (passengers, cargo, etc.).

Each of these individual objects has an individual CoG height ($h_{CoG}$,nominal, $h_{est}$) and the CoG of two objects is located at $h_{CoG,est}=h_{CoG,nominal}-\Delta h_{est}$. Then, a formula related to the CoG of composite objects can be used to extract the relation between their CoG heights of objects and their masses. Finally, using a parameter identification algorithm (e.g., least squares), the estimated vehicle mass $m_{est}$ is obtained. In Approach 2, on the other hand, the vehicle system is assumed to be a spring mass system. Using known vehicle specifications (i.e., dampening metrics), the spring stiffness can be identified. Then, adding extra mass will compress the spring mass system more. Thus, using the LIDAR point cloud data and the vehicle suspension dampening metrics, the estimated vehicle mass $m_{est}$ is obtained. The two outputs $h_{CoG,est}$ and $m_{est}$ are then utilized as part of one or more autonomous driving features (body control, rollover prevention, etc.).

Figure 4:
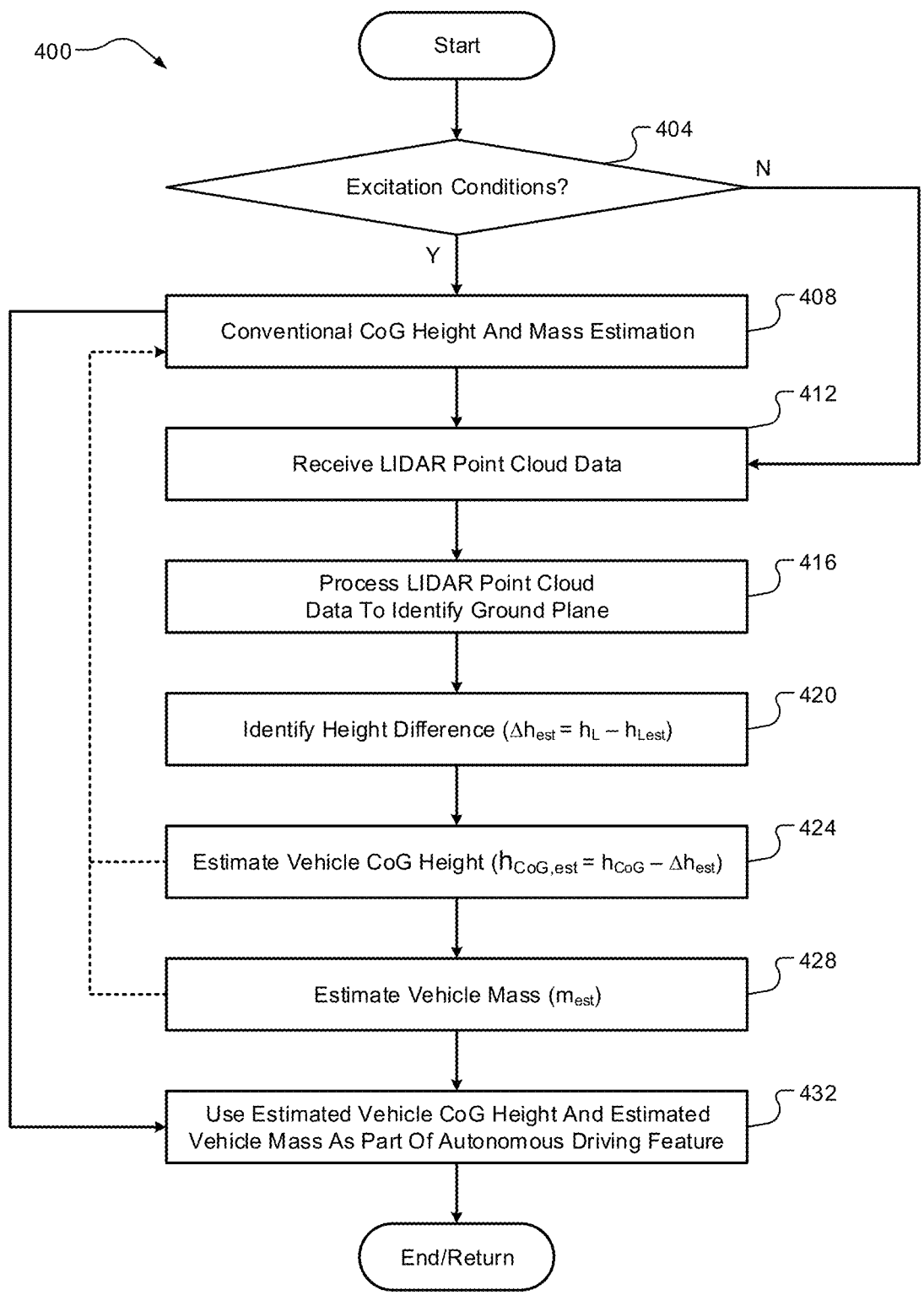
FIG. 4 is a flow diagram of an example vehicle CoG height and vehicle mass estimation method according to the principles of the present disclosure.

Referring now to FIG. 4, a flow diagram of an example vehicle CoG height and vehicle mass estimation method 400 is illustrated. At 404, the controller 116 determines whether vehicle excitation conditions are present. When true, the method 400 proceeds to 408 where the conventional techniques based on lateral and/or longitudinal dynamics and vehicle powertrain and/or suspension characteristics are utilized to detect or estimate vehicle CoG height and vehicle mass and the method 400 then proceeds to 432. When false, the method 400 proceeds to 412. At 412, the controller 116 receives the LIDAR point cloud data from the LIDAR sensor 124. At 416, the controller 116 processes (i.e., filters and extracts points from) the LIDAR point cloud data to identify the ground plane. At 420, the controller 116 identifies the height difference $\Delta h_{est}$ between (i) the nominal distance $h_L$ from the LIDAR sensor 124 to the ground plane and (ii) an estimated distance $h_{L,est}$ from the LIDAR sensor 124 to the ground plane using the processed LIDAR point cloud data. At 424, the controller 116 estimates the vehicle CoG height $h_{CoG,est}$ as a difference between (i) the nominal vehicle CoG height $h_{CoG}$ and (ii) the height difference $\Delta h_{est}$. At 428, the controller 116 estimates the vehicle mass $m_{est}$ based on one of (i) vehicle CoG metrics (Approach 1) and (ii) dampening metrics of the suspension 112 of the vehicle 100 (Approach 2). Optionally, the estimated vehicle CoG height $h_{CoG,est}$ and/or the estimated vehicle mass $m_{est}$ could also be fed back to and used for the conventional CoG height and mass estimation at 408. Finally, at 432, the controller 116 utilizes the estimated vehicle CoG height and vehicle mass as part of an autonomous driving feature of the vehicle 100. The method 400 then ends or returns to 404 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A center of gravity (CoG) height and mass estimation system for a vehicle, the system comprising:
   a light detection and ranging (LIDAR) sensor configured to emit light pulses and capture reflected light pulses that collectively form LIDAR point cloud data; and
   a controller configured to estimate the vehicle CoG height and the vehicle mass during a steady-state operating condition of the vehicle by:
      processing the LIDAR point cloud data to identify a ground plane;
      identifying a height difference between (i) a nominal distance from the LIDAR sensor to the ground plane and (ii) an estimated distance from the LIDAR sensor to the ground plane using the processed LIDAR point cloud data;
      estimating the vehicle CoG height as a difference between (i) a nominal vehicle CoG height and the height difference; and
      estimating the vehicle mass based on one of (i) vehicle CoG metrics and (ii) dampening metrics of a suspension of the vehicle.

2. The system of claim 1, wherein the vehicle further comprises an autonomous driving system comprising a model configured to utilize the estimated vehicle CoG height and the estimated vehicle mass as part of an autonomous driving feature.

3. The system of claim 1, wherein the estimating of the vehicle mass based on vehicle CoG metrics comprises (i) determining a relationship between the vehicle CoG and a CoG of an extra mass in the vehicle and (ii) implementing a least square algorithm to estimate the vehicle mass based on the determined relationship.

4. The system of claim 1, wherein the estimating of the vehicle mass based on vehicle suspension dampening metrics comprises (i) determining a spring stiffness of the vehicle suspension and (ii) estimating the vehicle mass based on the LIDAR point cloud data and the vehicle suspension spring stiffness.

5. The system of claim 1, wherein the processing of the LIDAR point cloud data to identify the ground plane comprises (i) filtering the LIDAR point cloud data to extract points having z-coordinates in a predetermined range and (ii) implementing a least square algorithm with the extracted points from the LIDAR point cloud data to identify the ground plane.

6. The system of claim 5, wherein the processing of the LIDAR point cloud data comprises identifying an intersection between the ground plane and a z-axis of the LIDAR point cloud data to estimate the estimated distance from the LIDAR sensor to the ground plane.

7. The system of claim 1, wherein the controller is further configured to estimate the vehicle CoG height and vehicle mass during an excitation operating condition of the vehicle based on vehicle lateral and/or longitudinal dynamics and vehicle powertrain and/or suspension characteristics.

8. The system of claim 7, wherein the controller is configured to, during the excitation operating condition of the vehicle:
    estimate the vehicle CoG height based on vehicle lateral and longitudinal motion and based on suspension characteristics or additional gyro devices; and
    estimate the vehicle mass based on vehicle longitudinal dynamics and vehicle powertrain characteristics.

9. The system of claim 8, wherein the excitation operating condition of the vehicle comprises at least one of (i) acceleration or deceleration of the vehicle above a first threshold and (ii) a steering angle of the vehicle above a second threshold.

10. A center of gravity (CoG) height and mass estimation method for a vehicle, the method comprising:
    receiving, from a controller of a vehicle, light detection and ranging (LIDAR) point cloud data from a LIDAR sensor of the vehicle, the LIDAR sensor being configured to emit light pulses and capture reflected light pulses that collectively form the LIDAR point cloud data; and
    during a steady-state operating condition of the vehicle, estimating, by the controller, the vehicle CoG height and the vehicle mass during a steady-state operating condition of the vehicle by:
        processing, by the controller, the LIDAR point cloud data to identify a ground plane;
        identifying, by the controller, a height difference between (i) a nominal distance from the LIDAR sensor to the ground plane and (ii) an estimated distance from the LIDAR sensor to the ground plane using the processed LIDAR point cloud data;
        estimating, by the controller, the vehicle CoG height as a difference between (i) a nominal vehicle CoG height and the height difference; and
        estimating, by the controller, the vehicle mass based on one of (i) vehicle CoG metrics and (ii) dampening metrics of a suspension of the vehicle.

11. The method of claim 10, wherein the vehicle further comprises an autonomous driving system comprising a model configured to utilize the estimated vehicle CoG height and the estimated vehicle mass as part of an autonomous driving feature.

12. The method of claim 10, wherein the estimating of the vehicle mass based on vehicle CoG metrics comprises (i) determining, by the controller, a relationship between the vehicle CoG and a CoG of an extra mass in the vehicle and (ii) implementing, by the controller, a least square algorithm to estimate the vehicle mass based on the determined relationship.

13. The method of claim 10, wherein the estimating of the vehicle mass based on vehicle suspension dampening metrics comprises (i) determining, by the controller, a spring stiffness of the vehicle suspension and (ii) estimating, by the controller, the vehicle mass based on the LIDAR point cloud data and the vehicle suspension spring stiffness.

14. The method of claim 10, wherein the processing of the LIDAR point cloud data to identify the ground plane comprises (i) filtering, by the controller, the LIDAR point cloud data to extract points having z-coordinates in a predetermined range and (ii) implementing, by the controller, a least square algorithm with the extracted points from the LIDAR point cloud data to identify the ground plane.

15. The method of claim 14, wherein the processing of the LIDAR point cloud data comprises identifying, by the controller, an intersection between the ground plane and a z-axis of the LIDAR point cloud data to estimate the estimated distance from the LIDAR sensor to the ground plane.

16. The method of claim 10, further comprising estimating, by the controller, the vehicle CoG height and vehicle mass during an excitation operating condition of the vehicle based on vehicle lateral and/or longitudinal dynamics and vehicle powertrain and/or suspension characteristics.

17. The method of claim 16, further comprising during the excitation operating condition of the vehicle:
    estimating, by the controller, the vehicle CoG height based on vehicle lateral and longitudinal motion and based on suspension characteristics or additional gyro devices; and
    estimating, by the controller, the vehicle mass based on vehicle longitudinal dynamics and vehicle powertrain characteristics.

18. The method of claim 17, wherein the excitation operating condition of the vehicle comprises at least one of (i) acceleration or deceleration of the vehicle above a first threshold and (ii) a steering angle of the vehicle above a second threshold.

* * * * *